United States Patent Office 3,737,466
Patented June 5, 1973

3,737,466
PRODUCTION OF CRESOLS
John Alan Sharp and Raymond Ernest Dean, Bradford, and Michael Fielding, Manchester, England, assignors to The Coal Tar Research Association, Gomersal, Cleckheaton, Yorkshire, England
No Drawing. Filed Oct. 20, 1969, Ser. No. 867,913
Int. Cl. C07c 37/16
U.S. Cl. 260—621 R                              8 Claims

ABSTRACT OF THE DISCLOSURE

Cresols are produced from phenol in a two-stage process. In the first stage, a mixture of methanol and phenol is passed over an alumina catalyst at a temperature between 250° and 450°. In the second stage, the reaction product of the first stage is mixed, if necessary, with more phenol and passed over an alumina catalyst at a temperature between 350° and 500° C. The amount of phenol in the mixture in the second stage is preferably such that the average molecular weight of the mixture is about 108.

---

The present invention relates to a process for the production of a cresol from phenol by reacting phenol with methanol in the vapour phase over an alumina catalyst and then in a second stage reacting either the whole or part of the catalysate with phenol in the vapour phase over an alumina catalyst.

The methylation of phenol with methanol in the presence of an alumina catalyst is known. It is characterized by a high ortho-selectivity and under suitable conditions gives good yields of o-cresol with very little of the meta- or para-isomers. It is, however, a disadvantage of this process that appreciable quantities of 2,6-xylenol and of anisole are also produced even at low conversions of phenol. At high conversions of phenol that amount of 2,6-xylenol can even exceed the amount of o-cresol and in addition substantial quantities of unwanted tri- tetra- methylphenols are formed in the reaction. The scope of the reaction is thus limited to the production of o-cresol in good yield at low conversions of phenol or to the production of o-cresol and 2,6-xylenol at high conversions of phenol.

Under present conditions there is a limited demand for 2,6-xylenol and its co-production with o-cresol constitutes an embarrassment which has restricted the development of a process based on the methylation of phenol. It is a particular feature of the present invention that in a second stage operation the whole or part of the product from the first or methylation stage can be treated with phenol in the vapour phase over an alumina catalyst so that a final product is obtained which is rich in cresols for which there is increasing demand. The effect of the second stage is to impart to the methylation process a flexibility which hitherto it did not possess whilst at the same time substantially increasing the value of the products.

Thus, the present invention consists in a process for the preparation of a cresol, which comprises: in a first stage, heating phenol and methanol in the presence of an alumina catalyst to produce a catalysate; and, in a second stage, heating the whole or part of said catalysate with phenol in the presence of an alumina catalyst.

The first or methylation stage can be accomplished over the temperature range 250–450° C., the preferred range being 280–340° C. The $\alpha$ form of alumina is more active than the $\gamma$- form and is preferably used for the alumina catalyst, and a partially dehydrated boehmite is particularly suitable for this purpose. (The designation $\alpha$ and $\gamma$, as used herein, follows the American nomenclature for hydrates of alumina.) The presence of basic impurities in the alumina reduces the activity of the catalyst and tends to make it more selective in that the formation of o-cresol and 2,6-xylenol is suppressed to a smaller extent than that of the other methyl-phenols. The loss in yield however outweighs any advantage arising from the improved selectivity. The presence of acidic impurities increases the activity of the catalyst giving a greater but less selective conversion of the phenol. It is thus preferable that the alumina catalyst should be substantially free from impurities although small amounts of acidic contaminants can be tolerated. The catalyst can be used in granular form in a static bed unit or it can be used in the form of microspheres in a fluidised bed. The latter modification is particularly useful since it provides a very satisfactory method of dissipating the heat generated by the exothermic reaction between phenol and methanol. A chromatographic grade of alumina can be used as the microspheroidal catalyst, any alkalinity being removed before use, for example, by washing in turn with hydrochloric acid, ammonia, acetic acid and water and then drying. In the case of static bed operation a multitubular reactor containing tubes not exceeding 1½ in. in diameter is preferred to a single tube of wider diameter. Contact times of above 1 second are normally used and the molar ratio of methanol to phenol is normally varied between 0.2:1 and 3.0:1. The catalyst remains active for prolonged periods but eventually does lose some of its activity, the rate of loss being greater the higher the ratio of methanol to phenol in the feedstock. The activity of the used catalyst can be restored to its original level by passing air through the heated catalyst bed at such a rate that the bed temperature does not exceed 550° C., and continuing the treatment until no carbon dioxide is detectable in the effluent gas.

The methanol is dehydrated by passage over the alumina catalyst to give dimethyl ether which is probably the methylating entity, and the methanol feed can in fact be replaced by an equivalent quantity of dimethyl ether without significantly affecting the results.

The type of product obtained is governed by the operating conditions. Low conversions of phenol with a high yield of o-cresol are favoured by the use of low methanol: phenol molar ratios, short contact times and low temperatures. Thus when methanol and phenol in a molar ratio of 0.5:1 are passed over an alumina catalyst at 290° C. with a contact time of 5 seconds, 34% of the phenol is converted giving the following molar yields of products: anisole 23.0, o-cresol 62.3, m/p-cresol 1.6 and 2,6-xylenol 12.2%. When higher methanol:phenol molar ratios are used in conjunction with higher temperatures and longer contact times the amount of phenol consumed in the reaction is increased, and the yield of 2,6-xylenol and higher methylphenols is also increased at the expense of the anisole and o-cresol. Thus using a feedstock consisting of methanol and phenol in a molar ratio of 2.2:1 over an alumina catalyst at 330° C. at a contact time of 15 seconds 82.5% of the phenol is converted giving the following molar yields of products: o-cresol 34.4, m/p-cresol 2.2, 2,6-xylenol 32.0, other xylenols 7.9 and higher methylphenols 16.6%.

Although the reaction variables are to a large extent interdependent, for example the effect of increasing the temperature can be modified by shortening the contact time, each variable has its own particular effect. Thus when a mixture of methanol and phenol in a molar ratio of 0.5:1 is passed over an alumina catalyst at 400° C. with a contact time of 5 seconds, 40% of the phenol is converted giving the following molar yields of products: o-cresol 63.4, m-cresol 4.5, p-cresol 3.6, 2,6-xylenol 16.2, other xylenols 12.3%. No anisole was found in the products of this run whereas this compound constituted a substantial part of the product of the run described above carried out at the same contact time and molar ratio of methanol to phenol but at the much lower temperature of 290° C. Anisole can be regarded as being an intermediate in the formation of o-cresol from phenol and methanol, and is itself rearranged to o-cresol when passed per se over an alumina catalyst in the vapour phase. Consequently it may be recovered from the methylation product and recycled along with the unchanged phenol.

When the methylation reaction is performed under more rigorous conditions, for example at higher temperatures and/or at longer contact times and/or at higher methanol:phenol ratios, a modified distribution pattern emerges in which the high level of ortho-specificity is much reduced. Thus when equimolar proportions of methanol and phenol are passed over an alumina catalyst at 450° C. and a contact time of 24 seconds the liquid recovery was 89.6% and the phenolic product consisted of: phenol 47.1, o-cresol 16.1, m-cresol 18.3, p-cresol 7.6, 2,6-xylenol 0.8, other xylenols 10.1 mole percent. It is considered that under these conditions the initial stage of the reaction still consists of the ortho-methylation of phenol to give predominantly o-cresol and 2,6-xylenol, probably via an anisole intermediate, but that this primary product then undergoes a further rearrangement or transalkylation reaction in which the phenol acts as a methyl acceptor, to yield a product of greater thermodynamic stability. Dealkylation and alkylation, isomerisation and disproportionation reactions all contribute in varying degrees to this rearrangement. Thus the 2,6-xylenol is substantially dealkylated to o-cresol, the methyl radicals reacting with molecules of phenol to form cresols. The cresols themselves isomerise, probably mainly by loss of a methyl group to an unsubstituted phenol molecule, giving under equilibrium conditions a distribution in which m-cresol represents the most and p-cresol the least favoured orientation whilst the amount of o-cresol produced approaches that of the m-isomer, the proportions being approximately 2.7 parts of m-cresol to 2.5 parts of o-cresol to 1 part of p-cresol. Some of the cresols are themselves methylated during the reaction to give xylenols, the 2,4-, 2,5- and 3,5-isomers representing the preferred orientations. It is considered that disproportionation effects play only a minor role in this transalkylation reaction since, for example, if 2,6-xlyenol is disproportionated by passage per se through a reactor at 450° C. in the presence of an alumina catalyst the proportion of phenol and cresols in the product is balanced by the amount of trimethyl and more highly methylated phenols formed, whereas it is a particular feature of the process of the present invention that the trimethylphenols are formed in minimal amounts and the more highly methylated phenols are virtually absent from the products.

Although it has been shown that the direct methylation of phenol with methanol over alumina can be performed under conditions leading to the formation of a product in which ortho- and meta-cresol are produced in roughly equal amounts and in which 2,6-xylenol is a minor component of the xylenols, this does not represent the preferred embodiment of the process of this invention, since under such conditions the liquid recovery is relatively low and an appreciable proportion of the methanol is decomposed to gaseous products and carbon which curtails the active life of the catalyst.

It is an advantage of the process of the present invention that the whole or part of the alkylate obtained from the first stage is passed, with added phenol, over an alumina catalyst to give a product, the cresol content of which is considerably increased with respect to that of the alkylate, mainly at the expense of the phenol, 2,6-xylenol, trimethylphenol and more highly methylated constituents. The reaction is unaffected by the presence of water and thus either the total catalysate from the first stage including the water formed during the methylation reaction can be used as feedstock with added phenol for the second stage, or alternatively the water can be separated from the catalysate and only the organic portion passed with added phenol, over the alumina catalyst of the second stage. It is an advantage of the present process that the total catalysate vapours from the first stage can be passed directly to the second stage without an intermediate condensation and re-vaporisation of the condensed catalysate. In another modification the product from the first or methylation reaction can be fractionated to remove water, anisole, phenol and o-cresol, and the residual material which consists substantially of xylenols and higher methylphenols can then be mixed with added phenol and passed over the alumina catalyst.

The alumina catalyst used in the second or transalkylation stage of the process is preferably of the same type and characteristics as that used in the first or methylation stage. The reaction can be conveniently operated at temperatures in the range 350–500° C., the preferred range being 400–470° C. Little heat is evolved or absorbed in the reaction and whilst multi-tubular or fluid-bed reactors can be used, they are unnecessary. The reactor can, in fact, consist of a single tube of suitable diameter. The catalyst tends to lose activity with use, and this has the effect of decreasing the conversion and increasing the yield of o-cresol with respect to that of the m-isomer. The activity of the used catalyst can however be restored to its original level by a treatment similar to that afforded the used alumina catalyst from the methylation reaction.

The proportion of phenol added to the whole or part of the catalysate from the first stage is adjusted to give the most advantageous product distribution. High yields of cresol are conveniently obtained by using a quantity of phenol such that the molecular weight of the combined feedstock approaches that of the cresols, vis 108. This usually involves the addition of some phenol to the catalysate, but where the methylation stage has been operated under conditions of low conversion an excess of phenol may be present in the catalysate. In such a case it is usually not economical to remove the excess phenol by fractionation and the catalysate is then used per se, the excess phenol having no effect on the reaction except to depress marginally the proportion of methylphenols boiling above the cresols in the product.

The constitution of the product is influenced by the time of contact of the feedstock vapours with the catalyst, the most advantageous results being given by contact times in the range 5–50 seconds.

The sequence of operations of the process of this invention can be controlled to give as the main product either a mixture of o- and m-cresol in roughly equal parts or o-cresol as the major component together with substantial amounts of the m-isomer as a subsidiary product. Thus if in the second, or trans-alkylation stage the feedstock consists of a mixture of phenol with the whole of the catalysate from the first stage then the main products from the two stages are m- and o-cresol, the yield of m-cresol usually being slightly greater than that of the o-isomer. On the other hand if the o-cresol is separated from the product of the first or methylation stage and only that portion of the product boiling above o-cresol treated with phenol over an alumina catalyst in the second stage, then o-cresol becomes the major overall product from the two stages. Whichever procedure is adopted p-cresol, although formed in appreciable quantities, is the least favoured isomer, the amount produced being about one-third that of the m-isomer.

The product of the process of the present invention can be fractionated to obtain the desired cresols, whilst the phenol fraction and the fraction boiling above the cresols and containing the xylenols and any more highly methylated phenols can be recovered for recycling. The product usually contains a small amount of neutral aromatic hydrocarbon contaminants comprising mainly toluene and xylenes with lesser amounts of benzene and trimethylbenzenes. These can be conveniently removed from the product by adding a small proportion of water to the product prior to fractionation. When this mixture is then fractionated the neutral impurities are substantially removed in the aqueous forerunnings leaving a phenolic product virtually free from neutral contaminants. If however the first or methylation stage of the process is carried out under vigorous conditions, for example by using a methanol:phenol molar ratio greatly in excess of 1:1 at a high temperature and long contact times, appreciable quantities of tetramethylphenols and pentamethylphenol may be formed. These may be accompanied by small quantities of tetra- and penta-methylbenzenes which will pass unchanged through the second or transalkylation stage of the process, and the proportion of these compounds in the product of the second stage of the process may even be enhanced by the dehydroxylation of a part of the tetramethylphenols and pentamethylphenol. Although the quantities of tetra- and penta-methylbenzenes in the final product are very small, probably not more than 1-2%, they are incompletely removed by the steam-stripping treatment mentioned above, and tend to remain with the phenolic fractions. Thus it has been found that durene, isodurene and prehnitene tend to become concentrated in the phenol fraction whilst pentamethylbenzene tends to remain in the cresols and xylenols fraction. Although it may not be essential for the cresols to be free from neutral impurities their presence is nevertheless a nuisance and furthermore the impurities in the phenol fraction and the fraction containing the xylenols and higher-boiling phenols will tend to build up during recycling. These impurities can only be removed from the phenols by tedious methods such as by dissolving the phenols in caustic soda and washing the aqueous solution with a light hydrocarbon solvent such as petroleum or benzene, and then acidifying the aqueous solution to recover the phenols. Accordingly in order to produce a phenolic product, particularly cresols, which is free from unwanted aromatic hydrocarbon impurities the first or methylation stage of the process must be conducted under conditions such that the production of tetramethylphenols and pentamethylphenol is at a minimum, in particular the molar ratio of methanol to phenol should not be greatly in excess of 1:1.

EXAMPLE 1

A solution of phenol in methanol in the proportion of 1 mole of phenol to 2.2 moles of methanol was pumped at a rate of 490 g. per hour into a vaporising unit and the vapours led into the base of a fluidised bed reactor. The reactor consisted of a stainless steel tube of internal diameter 3.7 inches with a stainless steel sintered baseplate which supported 1.8 liters of acid-washed microspheroidal α-alumina of particle size 100–200 British standard mesh. The catalyst was a chromatographic grade of alumina and prior to use was washed in turn with hydrochloric acid, ammonia, acetic acid and water, and then dried. The fluidised bed of the alumina catalyst was maintained at a temperature within the range 320–340° C., preferably at or near 330° C., throughout the run. The vaporised feedstock was passed through the reactor for a period of 50 hours at a contact time of about 17 sec., and the product vapours condensed and collected. The recovery of liquid product was 99.5% and consisted of:

Table 1

| Aqueous phase: | Percent |
|---|---|
| Phenol | 0.4 |
| Water | 17.8 |
| Organic phase: | |
| Phenol | 10.8 |
| o-Cresol | 13.0 |
| m-Cresol | 0.6 |
| p-Cresol | 0.3 |
| 2,6-xylenol | 16.0 |
| Other xylenols | 3.6 |
| Trimethylphenols | 9.0 |
| Tetramethylphenols | 5.1 |
| Pentamethylphenol | 6.9 |
| Neutral oils | 4.8 |
| Water | 7.8 |
| Pitch | 3.4 |
| | 99.5 |

Samples were withdrawn from the product at intervals during the course of the run and the phenolic portions of these were analysed by gas-liquid chromatographic analysis. The distribution of the phenols in some of these samples is shown in the following table:

TABLE 2

| | Sample Number | | | | | |
|---|---|---|---|---|---|---|
| | 0 | 1 | 5 | 10 | 15 | 19 |
| Time from start of run (hr.) | 0.5 | 1 | 6 | 21 | 36 | 48 |
| Temperature, °C | 340 | 332 | 331 | 331 | 322 | 330 |
| Constitution of phenolic portion (wt. percent): | | | | | | |
| Phenol | 13.3 | 13.6 | 16.1 | 19.2 | 20.0 | 24.5 |
| o-Cresol | 20.2 | 20.4 | 21.8 | 22.2 | 20.7 | 23.5 |
| m-Cresol | 2.5 | 2.0 | 1.4 | 1.0 | 2.1 | 1.2 |
| p-Cresol | 1.9 | 1.6 | 1.0 | 0.6 | 0.5 | 0.6 |
| 2,6-xylenol | 12.5 | 14.6 | 20.3 | 23.5 | 21.7 | 22.1 |
| Other xylenols | 19.8 | 16.1 | 10.4 | 7.7 | 6.5 | 5.8 |
| Trimethylphenols | 21.4 | 19.2 | 16.6 | 13.6 | 12.8 | 11.6 |
| Tetramethylphenols | 7.4 | 10.5 | 7.2 | 6.7 | 8.0 | 5.9 |
| Pentamethylphenol | 1.0 | 1.8 | 5.1 | 5.5 | 7.7 | 4.7 |

The catalyst shows a slight aging effect due to the deposition of a small amount of carbon, which is apparent from the decline in the proportion of phenol converted. This is accompanied by a definite increase in the proportions of o-cresol and 2,6-xylenol formed, at the expense of the other xylenols and higher alkylphenols. The overall effect of aging of the catalyst is that it becomes more specific in its action.

The organic phase containing dissolved water was then fractionated in a 15-plate column at atmospheric pressure until the column head temperature reached 195° C. The residual material was then flash distilled at 50 mm. pressure leaving a residue of pitch:

Table 3

| Fractions: | Percent of charge |
|---|---|
| Boiling <100° C. | 10.0 |
| Boiling 100° C.–195° C. | 38.0 |
| Flash distillate at 50 mm. | 45.2 |
| Residual pitch | 4.3 |
| Loss | 2.5 |

No attempt was made to trap the dimethyl ether present in the alkylate liquor and this together with some methanol accounts for most of the loss. The fractions boiling up to 100° C. consisted mainly of water with dissolved phenol, methanol and some neutrals. The fraction boiling up to 195° C. contained virtually all the phenol and o-cresol with about 15% of 2,6-xylenol and 3% of anisole.

The flash distillate which contained most of the xylenols and all the higher boiling phenols was then mixed with phenol in the proportion of 56.8 parts of phenol to 43.2 parts of flash distillate to give a mixture having an average molecular weight of 108. This material was then pumped at a rate of about 140 g. per hour into a vaporiser unit and the ensuing vapours passed down a vertical tubular reactor containing an upper preheater section packed with Steatite beads above a catalyst bed supported on a further bed of Steatite beads. The catalyst bed, which was maintained at a temperature in the range 440–460° C. preferably at or near 450° C., consisted of granules of size 8–16 British standard mesh of type A alumina. The feedstock was passed over the catalyst for a period of 12 hours the time of contact of the vapour with the catalyst being 20–25 sec. The product vapours were condensed and collected, and samples were withdrawn and analysed at hourly intervals. The product from the first hour of operation was ignored since during this period the catalyst is in a highly active state and causes the formation of an excessive amount of neutral products which is accompanied by an appreciable deposition of carbon on the catalyst. The material collected between the end of the first hour and the completion of the run was combined for analysis and further examination. The recovery of liquid product during this period was 98.3% of the material fed whilst gaseous products accounted for a further 0.7%. The amount of carbon deposited on the catalyst during the whole run was equivalent to 4.6% of the feed. The constitution of the original flash distillate, of the flash distillate after addition of the requisite amount of phenol, and of the liquid product of the rearrangement reaction are given in Table 4.

TABLE 4

| Material | Wt. percent constitution of— | | |
|---|---|---|---|
| | Flash distillate | Flash distillate plus phenol | Liquid product of rearrangement reaction |
| Phenols: | | | |
| Phenol | 0 | 57.2 | 26.2 |
| o-Cresol | 0.9 | 0.4 | 17.1 |
| m-Cresol | 0.5 | 0.2 | 13.1 |
| p-Cresol | 0.5 | 0.2 | 5.2 |
| 2,6-xylenol | 29.1 | 12.4 | 3.4 |
| Other xylenols | 11.6 | 4.9 | 18.5 |
| Trimethylphenols | 23.9 | 10.3 | 4.0 |
| Tetramethylphenols | 11.2 | 4.8 | |
| Pentamethylphenol | 8.8 | 3.8 | |
| Total | 86.5 | 94.2 | 87.5 |
| Neutral oil | 6.5 | 2.8 | 3.6 |
| Water | | | 1.9 |
| Pitch | | | 4.6 |

The analysis of some of the hoursly samples are given in Table 5.

These results show the effect of the aging of the catalyst. Less of the feedstock is converted as shown by the gradual increase in the amount of phenol and 2,6-xylenol in the product as the run progresses. The level of o-cresol is fairly well maintained throughout but that of m-cresol reaches a maximum in 2–4 hours declining thereafter.

The m-cresol content could be increased even with an aging catalyst as shown by the results for fraction 12 where the catalyst temperature had been raised to 475° C. Only traces of phenols boiling above the xylenols could be detected in the product during the first 6 hours, but the proportion of these increased in the later fractions. The analysis of the combined fractions 2–6 and 2–12 are also included in the table to illustrate the effect of extending the operating time beyond the period of optimum catalyst activity.

The bulked fractions 2–12 were then fractionated in a 15-plate column at atmospheric pressure, water being added to the charge to assist in the removal of neutrals by steam-stripping. The fraction containing the xylenols and higher-boiling phenols, comprising 23 wt. percent of the organic charge and containing 5.7 wt. percent of neutrals was mixed with phenol in the proportion of 47.5 parts of the xylenol fraction to 52.5 parts of phenol to give a mixture having an average molecular weight of 108. This mixture was then rearranged by passage over an alumina catalyst at a temperature at or near 465° C. at a contact time of about 25 sec. for a period of 7 hr. using the apparatus previously described. The product vapours were condensed and collected, hourly samples being withdrawn for analysis. The recovery of liquid product during the period between the end of the first hour of operation and the completion of the run, fractions 2–7, was 95.6 wt. percent of the material fed whilst the gas produced was equivalent to 0.8 wt. percent of the feed; carbon deposition on the catalyst amounted to 5.4 wt. percent of the material fed during the whole run. The constitution of the feedstock and of the liquid product of the rearrangement reaction (combined fractions 2–7) are given in Table 6. Analysis of the hourly samples showed that their constitution remained fairly uniform over the 7 hour period of operation, the level of m-cresol being well maintained throughout. The ratio of meta- to ortho-cresol was slightly higher in this run than the previous one, probably due to the slightly higher temperature used.

TABLE 6

| | Wt. percent constitution of— | | | |
|---|---|---|---|---|
| | 1st recycle run | | 2nd recycle run | |
| Materials | Xylenols plus phenol | Fractions 2–7 of rearranged product | Xylenols plus phenol | Fractions 2–5 of rearranged product |
| Phenols: | | | | |
| Phenol | 52.4 | 32.6 | 42.9 | 32.0 |
| o-Cresol | 0.3 | 14.7 | | 14.0 |
| m-Cresol | 6.2 | 16.4 | 5.3 | 15.8 |
| p-Cresol | 2.5 | 6.2 | 1.8 | 6.1 |
| 2,6-xylenol | 0.8 | 1.5 | | 1.4 |
| Other xylenols | 24.4 | 13.3 | 36.1 | 16.4 |
| Trimethylphenols | 7.3 | 2.0 | 6.2 | 2.9 |
| Tetramethylphenols | 2.0 | | 1.6 | |
| Total | 95.9 | 86.7 | 93.9 | 88.6 |
| Neutral oil | 2.7 | 4.9 | 4.8 | 7.3 |
| Water | 0 | 2.0 | 0 | 1.9 |
| Pitch | | 5.0 | | N.D. |

Note.—N.D.=Not determined.

The combined fractions 2–7 of this first recycle run were fractionated as previously described and the fraction containing the xylenols and the higher boiling phe-

TABLE 5

| | Hourly fractions | | | | | | |
|---|---|---|---|---|---|---|---|
| | Feed | 2 | 4 | 8 | 11 | 12 | 2–12 combined | 2–6 combined |
| Temperature, ° C | | 458 | 458 | 455 | 465 | 475 | ~458 | ~458 |
| Contact time, (sec.) | | 20.6 | 23.0 | 21.3 | 22.2 | 25.6 | ~23.0 | ~21.5 |
| Liquid recovery (wt. percent) | | 108.6 | 94.8 | 95.8 | 90.6 | 97.6 | 98.3 | 98.2 |
| Neutral oil content (wt. percent) | 2.8 | 5.6 | N.D. | 3.6 | 3.8 | N.D. | 3.6 | N.D. |
| Water content (wt. percent) | 0 | 4.0 | N.D. | 1.8 | 2.1 | N.D. | 1.9 | N.D. |
| Phenols (wt. percent of fraction): | | | | | | | | |
| Phenol | 57.2 | 25.1 | 24.3 | 28.9 | 30.3 | 28.5 | 26.2 | 26.0 |
| o-Cresol | 0.4 | 16.0 | 15.1 | 18.9 | 17.8 | 17.1 | 17.1 | 15.8 |
| m-Cresol | 0.2 | 15.6 | 16.6 | 12.2 | 10.3 | 13.2 | 13.1 | 15.3 |
| p-Cresol | 0.2 | 6.0 | 6.2 | 5.2 | 4.6 | 5.3 | 5.2 | 5.9 |
| 2,6-xylenol | 12.4 | 2.1 | 1.7 | 3.2 | 4.0 | 2.9 | 3.4 | 2.0 |
| Other xylenols | 4.9 | 17.0 | 17.6 | 17.6 | 16.5 | 16.3 | 18.5 | 16.6 |
| Trimethyl phenols | 10.3 | <2.0 | <2.0 | 3.6 | 5.0 | 4.0 | 4.0 | <2.0 |
| Tetramethyl phenols | 4.8 | | | | | | | |
| Pentamethyl phenol | 3.8 | | | | | | | |

Note.—N.D.=Not determined.

nols, equivalent to 15 wt. percent of the organic charge and containing 8.5 wt. percent of neutrals, was rearranged after the addition of the appropriate amount of phenol over an alumina catalyst in the static bed reactor as previously described. The catalyst bed temperature was 453–457° C. and the contact time about 24 sec., whilst the total run occupied 5 hr. The recovery of liquid product was 94.5 wt. percent and the gas produced equivalent to 0.8 wt. percent of the material fed between the end of the first hour and completion of the run; carbon deposition on the catalyst amounted to 6.1 wt. percent of the material fed over the whole run. The analyses of the feedstock and rearranged liquid products of this second recycle run are included in Table 6. The constitution of the hourly fractions and of the combined fractions 2–5 were virtually identical with the results of the first recycle experiment.

The series of experiments in this example demonstrates that the fraction boiling above the cresols recovered from the product obtained by alkylating phenol with methanol can be rearranged by passing with phenol in the vapour phase over an alumina catalyst to yield catalysate containing roughly equal parts of o- and m-cresol, together amounting to about 30% of the catalysate, and that the phenols boiling above the cresols can again be rearranged with phenol over an alumina catalyst to give a catalysate of almost identical constitution with the first catalysate. Further recycling of the higher boiling portions of each catalysate can be performed giving products of almost identical composition at each stage.

EXAMPLE 2

The purpose of the work described in this example was to establish whether any improvement could be achieved by the simultaneous injection of steam into the reactor with the phenolic feedstock, in particular whether this would lead to a reduction in the rate and quantity of carbon deposition on the catalyst.

The phenolic feedstock used was that described in Example 1, having an average molecular weight of 108 and being a mixture of phenol with the xylenols fraction recovered from the alkylate obtained by reacting methanol with phenol over an alumina catalyst. To this material was added 5 wt. percent of water and the mixture was then pumped into a vaporiser and the vapours led into the static bed reactor containing a granulated type A alumina catalyst, as described in Example 1, for a period of 9 hours, the time of contact of the vapour with the catalyst being about 25 sec. The temperature of the catalyst bed was maintained at 460–470° C. The product vapours were condensed and the condensates from each hour of running were collected separately and analysed. The material collected between the end of the first hour and the completion of the run was subsequently combined for analysis and further examination. During this period the liquid recovery was 95.6 wt. percent and the gas evolution equivalent to 0.8% of the organic material fed. The amount of carbon deposited on the catalyst during the whole run was equivalent to 4.7 wt. percent of the organic feedstock, that is virtually the same as that obtained when the same phenolic feedstock was passed through the reactor in the absence of water. The analyses of the feedstock used and the liquid products of the reaction are given in Table 7(I).

This shows the constitution of the rearranged product to be very similar to that of the combined fractions 2–6 of Example 1 (Table 5) obtained when the same feedstock was passed over the alumina catalyst in the absence of steam. The results of the analysis of the hourly samples also followed the same pattern as in the earlier run.

The combined fractions 2–9, being the product collected from the end of the first hour until the completion of the run, were fractionated in a 15-plate column at atmospheric pressure with steam stripping to remove neutrals. The fraction containing the xylenols and higher boiling phenols and 8.2% of neutrals, equivalent to 18% of the organic portion of the charge, was then mixed with phenol in the proportion of 57 parts of the xylenol fraction to 43 parts of phenol to give a mixture of average M. Wt. 108. This mixture was then rearranged in the absence of water over an alumina catalyst at 450–460° C. with an average contact time of 23 sec. for a period of 6 hrs. Hourly fractions were collected and analysed as before. The recovery of liquid product was 99.3 wt. percent and the gas produced was equivalent to 0.5 wt. percent of the material fed between the end of the first hour and completion of the run. Carbon deposition on the catalyst amounted to 3.5 wt. percent of material fed over the 6 hr. duration of the run.

TABLE 7

| Materials | Wt. percent constitution of— | | | |
| --- | --- | --- | --- | --- |
| | I | | II | |
| | Alkylate plus phenol | Fractions 2–9 of rearranged product | Xylenols fraction plus phenol | Fractions 2–6 of rearranged product |
| Phenols: | | | | |
| Phenol | 54.5 | 25.0 | 43.0 | 27.0 |
| o-Cresol | 0.4 | 15.5 | | 13.9 |
| m-Cresol | 0.2 | 15.1 | 5.3 | 16.6 |
| p-Cresol | 0.2 | 5.3 | 1.9 | 6.2 |
| 2,6-xylenol | 11.8 | 2.3 | | 1.9 |
| Other xylenols | 4.4 | 17.6 | 34.1 | 17.8 |
| Trimethylphenols | 9.8 | 2.8 | 7.9 | 3.3 |
| Tetramethylphenols | 4.7 | | 0.8 | |
| Pentamethylphenol | 3.6 | | | |
| Total | 89.6 | 83.6 | 93.0 | 86.7 |
| Neutral oil | 2.7 | 3.7 | 4.7 | 7.0 |
| Water | 5.0 | 6.8 | 0 | 2.4 |
| Pitch | | 6.2 | | 3.4 |

The constitution of the rearranged product is given in Table 7(II) and is similar to that from the first pass of the alkylate fraction with added phenol over the catalyst. The total quantity of cresols in the product is almost identical in both runs, the slightly higher proportion of m-cresol in the recycle experiment reflecting the higher activity associated with a shorter period of operation, and, to a less extent, the difference in the distribution pattern of the phenols in the two feedstocks.

EXAMPLE 3

The feedstock used in this example consisted of a mixture of phenol and the organic portion of the alkylation product obtained as described in Example I by the vapour phase alkylation of phenol with methanol in a fluidised bed reactor. The amount of phenol added was adjusted so that the average molecular weight of the mixed feedstock was approximately 108.

This feedstock was pumped at a uniform rate into a vaporiser and the vapours led into the static bed reactor containing granulated type A alumina as described in previous examples. The duration of the run was 8 hours whilst the residence time of the vapours in contact with the catalyst varied between 20 and 30 sec. The temperature of the catalyst bed was 410° C. during the first hour of operation, between 440 and 450° C. during the next five hours, and 470° C. in the last two hours. The overall recovery of liquid products was 92.4 wt. percent, whilst 0.5 wt. percent of the feed was converted to gaseous products and 6.4 wt. percent to carbon which was deposited on the catalyst. The products of each hour of running were collected separately and analysed, and the results of some of these are given in Table 8.

During the first hour when the temperature was 410° C. o-cresol was the major product, the yield of the m-isomer being small and the conversion of 2,6-xylenol low. As the temperature was increased so the conversion of phenol and 2,6-xylenol increased giving an improved yield of m-cresol and xylenols other than the 2,6-isomer, and a decrease in the yield of o-cresol. In the period between the end of the first and sixth hours of operation when the temperature was between 440 and 450° C. the amount of o-cresol in the product exceeded that of the metaisomer, but when the temperature was raised to 470° C. during the last two hours the proportion of m-cresol increased until it exceeded that of the o-cresol. The combined total of o- and m-cresols in the hourly products lay between about 29 and 33% throughout the run. The neutral oils in the feedstock consisted mainly of anisole and this rearranges during the reaction forming cresols. The neutrals present in the reaction products consisted of methylbenzenes.

TABLE 8

| | Feed | Hourly fractions | | | | | |
|---|---|---|---|---|---|---|---|
| | | 1 | 2 | 3 | 6 | 7 | 8 |
| Temperature (° C.) | | 410 | 440 | 445 | 450 | 470 | 470 |
| Contact time (sec.) | | 30.4 | 28.7 | 26.0 | 21.0 | 27.8 | 26.7 |
| Liquid recovery (wt. percent) | | 66.0 | 104.0 | 94.5 | 84.1 | 101.4 | 93.4 |
| Analysis of products (wt. percent of fraction)—phenols: | | | | | | | |
| Phenol | 42.9 | 34.3 | 34.1 | 30.6 | 26.4 | 31.0 | 27.1 |
| o-Cresol | 10.6 | 25.9 | 24.1 | 19.8 | 18.9 | 15.6 | 16.1 |
| m-Cresol | 0.5 | 3.0 | 6.5 | 12.2 | 12.9 | 18.2 | 16.6 |
| p-Cresol | 0.3 | 1.5 | 4.0 | 5.5 | 5.6 | 6.4 | 5.8 |
| 2,6-xylenol | 13.1 | 9.8 | 5.4 | 2.9 | 3.1 | 2.0 | 2.3 |
| Other xylenols | 3.0 | 8.7 | 13.5 | 13.3 | 15.7 | 15.2 | 14.5 |
| Trimethylphenols | 7.4 | | | | | | |
| Tetramethylphenols | 4.2 | | | | | | |
| Pentamethylphenol | 5.6 | | | | | | |
| Neutral oils (wt. percent) | 6.4 | N.D. | 1.1 | 1.5 | N.D. | 2.8 | N.D. |
| Water (wt. percent) | 3.9 | N.D. | 5.8 | 7.0 | N.D. | 7.1 | N.D. |

NOTE.—N.D. = Not determined.

EXAMPLE 4

The feedstock used in the experiment described in this example was the total organic and aqueous product obtained as described in Example 1 from the methylation of phenol with methanol using microspheroidal alumina as catalyst in the fluidised bed unit. For the purposes of this experiment the two phases were separated and sufficient phenol was added to the organic phase to bring the average molecular weight of the phenolic portion of the system to 108. The aqueous and organic phases were then pumped separately into the vaporiser section of the static bed reactor unit containing type A alumina granules described in Example 1 and the vapours led into the catalyst zone. The rate of pumping of the aqueous and organic phases was controlled so that they passed through the reactor in the same proportion as that in which they were present in the original alkylation product. The catalyst used in Example 3 was reactivated by passing air through the heated bed at a rate such that the bed temperature did not exceed 550° C. This treatment was continued until no carbon dioxide could be detected in the effluent gas. The regenerated catalyst was then used in the present example.

After the first hour of operation, the temperature of the catalyst was maintained between 445 and 465° C., mainly between 450 and 455° C., the contact time being about 25 sec. The run occupied 8 hours and the recovery of liquid products during the last 7 hours of operation was 95.5% whilst 0.7 wt. percent of the total feed was converted to gaseous products and 7.8 wt. percent to carbon. Analysis of the hourly fractions showed the same general trends as in previous examples. Compared with the first six hours running of the experiment described in Example 3 the ratio of meta- to ortho-cresol is slightly greater in the present example due to the rather higher temperature used. The composition of the combined hourly fractions 2–8 of the rearranged product are compared with that of the feedstock in Table 9.

TABLE 9

| | Wt. percent constitution of— | |
|---|---|---|
| Material | Feedstock | Combined fractions 2-8 |
| Phenols: | | |
| Phenol | 37.4 | 16.6 |
| o-Cresol | 9.2 | 11.1 |
| m-Cresol | 0.4 | 13.2 |
| p-Cresol | 0.3 | 5.0 |
| 2,6-xylenol | 11.4 | 1.5 |
| Other xylenols | 2.5 | 15.4 |
| Trimethylphenols | 6.6 | 2.3 |
| Tetramethylphenols | 3.6 | |
| Pentamethylphenol | 4.9 | |
| Neutral oils | 3.8 | 2.9 |
| Water | 17.4 | 20.1 |

The results demonstrate that not only can a used catalyst be regenerated and re-used, but also that an alkylate produced by the vapour phase methylation of phenol can be used as the feedstock for the rearrangement reaction without prior separation of the aqueous phase. Furthermore it would be feasible to take the alkylate vapours from the alkylation reaction and introduce them directly into a second reactor with added phenol where they would undergo the rearrangement reaction. Such an arrangement would be economically advantageous in that the intermediate stages of condensation, phase separation and vaporisation could be eliminated.

In a further and more detailed examination, hourly fractions 2, 3, 5 and 7 of the product were bulked together (397.7 g.) and analysed. The quantity of feed corresponding to these fractions was 404.2 g. and the amount of gas produced was 3 g. The quantity of carbon formed during the production of these fractions was arrived at by difference:

| | Grams | Wt. percent |
|---|---|---|
| Liquid products | 379.7 | 93.9 |
| Gas | 3.0 | 0.7 |
| Carbon (by difference) | 21.5 | 5.3 |
| Total | 404.2 | |

The analytical breakdown of feed and products is summarised in Table 10.

TABLE 10

| | Feed (g.) | Product (g.) |
|---|---|---|
| Total fed | 404.2 | |
| Composition: | | |
| Phenol | 151.5 | 66.6 |
| o-Cresol | 37.4 | 43.3 |
| m-Cresol | 1.8 | 53.0 |
| p-Cresol | 1.1 | 19.5 |
| 2,6-xylenol | 46.2 | 4.8 |
| Other xylenols | 10.6 | 58.0 |
| Trimethylphenols | 26.2 | 7.9 |
| Tetramethylphenols | 14.8 | |
| Pentamethylphenol | 19.8 | |
| Total | 309.4 | 253.1 |
| Pitch | | 21.7 |
| Water | 70.2 | 80.3 |
| Neutrals | 15.4 | 11.5 |
| Carbon | | 21.5 |
| Gas | | 3.0 |
| Total accounted for | 395.0 | 391.1 |

Thus the weight of cresols has been increased by the rearrangement process, from 40.3 g., mainly o-cresol, to 115.8 g. consisting of 37.4% o-, 45.8% m- and 16.8% p-cresol. The distribution pattern of the xylenols also underwent considerable modification. Thus in the feedstock 81% of the 56.8 g. xylenols present comprised 2,6-xylenol, whereas in the product there were 62.8 g. of xylenols of which only 8% was 2,6-xylenol, the major components being the 2,4-, 2,5- and 3,5-isomers. All the tetramethylphenols and 18.3 parts of the trimethylphenols in the feedstock were also used in the reaction. The consumption of phenol required to bring about these changes was 84.9 g.

EXAMPLE 5

The alkylate feedstock used in each of the previous examples was that produced as described in Example 1 in which a vaporised mixture of phenol and methanol in the proportion of 2.2 moles of methanol to 1 mole of phenol was passed through a fluidised bed of microspheroidal alumina at a temperature of about 330° C. and an average contact time of 17 sec. In addition to the phenolic materials and water formed during the reaction there is also produced 5.2% of neutral compounds of which 1.2% is pentamethylbenzene, the balance being a small amount of anisole together with benzene, toluene, xylenes, tri- and tetramethylbenzenes. When the alkylate is subsequently subjected to the rearrangement reaction the anisole is converted to cresols but the methylbenzenes pass through the reactor unchanged. The benzene, toluene, xylenes and trimethylbenzenes can be effectively removed from the product by steam-stripping during the fractionation stage, but the tetramethylbenzenes and pentamethylbenzene cannot be completely removed by this treatment.

Any neutrals associated with the phenol fraction recovered by fractionation are predominantly tetramethylbenzenes, about 50% being isodurene, whilst the neutrals associated with the cresols and xylenols fractions consist essentially of pentamethylbenzene. These methylbenzenes are formed by the breakdown of the corresponding phenols and their presence in the cresols and xylenols fractions can be a considerable disadvantage in the use of such phenols for certain applications. The formation of tetramethylbenzenes and pentamethylbenzene can however be minimised if the initial alkylation is controlled so that the amounts of tetramethylphenols and pentamethylphenol produced are very small. This is preferably done in a static bed reactor of diameter not exceeding 1½ inches using a catalyst consisting of type A α-alumina in the form of granules, since it has been observed that fluid bed operation tends to yield a wider spread of products particularly the more highly alkylated phenols. This is attributable to the more active nature of the acid-washed microspheroidal catalyst used and partly to backmixing effects causing a portion of the feed to remain in contact with the catalyst for an excessive length of time.

The factors controlling the course of the alkylation reaction are catalyst temperature, contact time and the molar proportions of phenol and methanol used. These variables are to a large extent interdependent. The series of experiments now described shows how the product distribution can be determined within limits by altering the reaction variables. In each case the vaporised feedstock was passed down a vertical tubular reactor of 1 inch internal diameter, containing a catalyst zone consisting of type A α-alumina in granules of size 8–16 B.S. mesh. The catalyst was supported on a packing of Steatite beads and a packing of the same material above the catalyst served as a preheating section. The results of the alkylation experiments are summarised in Table 11 in which, for comparison, are included the results of the original run in the fluidised bed unit.

Comparing the fluid bed run 1 with the static bed run 2, both carried out under similar operating conditions, the yields of tetramethylphenols and pentamethylphenol are appreciably higher in the fluid bed run, whilst those of the cresols and xylenols are higher in static bed operation. The extent of the formation of neutral oils, including pentamethylbenzene is similar in each case. When the ratio of methanol to phenol in the feedstock was reduced from 2.2:1 to 1.2:1 there was a marked decrease in the yield of tri- and tetra-methylphenols and pentamethylphenol whilst the yield of o-cresol increased. Runs 4–7 demonstrate the effects of further reducing the proportion of methanol in the feedstock and also lowering the temperature and contact time.

TABLE 11

| | Fluid bed | | Static bed | | | | |
|---|---|---|---|---|---|---|---|
| Run Number | 1 | 2 | 3 | 4 | 5 | 6 | 7 |
| MeOH/PhOH (moles) | 2.2 | 2.2 | 1.2 | 1.0 | 1.0 | 0.75 | 0.75 |
| Temperature (° C.) | 330 | 330 | 330 | 325 | 325 | 320 | 320 |
| Contact time (sec.) | 17 | 15 | 14 | 10 | 5 | 10 | 5 |
| Composition of product (wt. percent—phenols): | | | | | | | |
| Phenol | 11.6 | 10.2 | 27.4 | 33.9 | 33.9 | 45.0 | 50.8 |
| o-Cresol | 14.0 | 18.6 | 27.4 | 25.8 | 23.6 | 28.0 | 23.7 |
| m-Cresol | 0.7 | 0.6 | 0.5 | 0.3 | 0.1 | Trace | Trace |
| p-Cresol | 0.3 | 0.6 | 0.5 | 0.5 | 0.5 | 0.4 | Trace |
| 2,6-xylenol | 17.3 | 19.5 | 17.1 | 10.9 | 8.4 | 9.3 | 6.6 |
| Other xylenols | 3.9 | 4.8 | 3.0 | 2.1 | 1.7 | 1.2 | 1.2 |
| Trimethylphenols | 9.7 | 10.8 | 4.6 | 2.3 | 1.8 | 1.3 | 1.1 |
| Tetramethylphenols | 5.5 | 4.0 | 1.8 | 0.8 | 0.7 | Trace | Trace |
| Pentamethylphenol | 7.4 | 2.8 | 1.1 | 0.3 | 0.2 | Trace | Trace |
| Total | 70.4 | 71.9 | 83.4 | 76.9 | 70.9 | 85.2 | 83.4 |
| Neutrals: | | | | | | | |
| Pentamethylbenzene | 1.2 | 1.8 | 0.5 | 0.2 | | | |
| Other neutrals | 4.0 | 3.5 | 3.6 | 8.4 | 9.8 | 5.5 | 9.2 |
| Total neutrals | 5.2 | 5.3 | 4.1 | 8.6 | 9.8 | 5.5 | 9.2 |
| Water | 24.1 | 24.2 | 15.1 | 14.2 | 14.2 | 11.5 | 11.5 |

Thus in runs 4 and 5 using a 1:1 molar ratio of methanol to phenol at 325° C. the yields of tetramethylphenols, pentamethylphenol and pentamethylbenzene are considerably reduced compared with run 2, and when still milder conditions are applied as in runs 6 and 7, where the methanol:phenol ratio and the temperature are further reduced, these compounds virtually disappear from the product. There is a marked decline also in the yield of xylenols and trimethylphenols, but the o-cresol is maintained at a reasonable level, 23.7 to 28.0% of the product, throughout runs 4–7. Although the neutrals in these runs are at a higher level than those in runs 1 and 2, their constitution is fundamentally different, anisole being by far the major component accompanied by substantial amounts of o-methylanisole, traces of the m- and p-isomers and small amounts of 2,6-dimethylanisole. Hydrocarbon impurities are limited to small quantities of benzene, toluene, xylenes and trimethylbenzenes with only traces of pentamethylbenzene. When the anisoles are passed over an alumina catalyst under the conditions of the rearrangement process they are converted to methylphenols and thus do not contribute to the neutral content of the final product. Thus when any of the alkylation products 4-7 above is used as feedstock for a transalkylation reaction the anisoles are rearranged along with the phenols whereas the methylbenzenes pass through the reactor unchanged and since these consist essentially of hydrocarbons up to $C_9$, they can be removed from the product by steam-stripping to leave phenolic products virtually free from neutral contamination.

In a further experiment the organic portion only of the alkylation product from run 4 above was used in a transalkylation reaction. This material had an average molecular weight of about 105, that is just below that of the cresols, and was used per se, being vaporised and the vapours passed through the reactor of the static bed unit described in Example 1, using as catalyst type A $\epsilon$-alumina in the form of granules of size B.S. mesh 8-16. The duration of the run was four hours, the catalyst temperature 455-460° C. and the contact time 25 sec. The analyses of the feed and product are detailed in Table 12.

As in previous examples the product from the first hour of operation was ignored. The liquid recovery was 94.2 wt. percent of the feed passed through the reactor between the end of the first hour and the completion of the run, three hours later. The gas produced during this time corresponded to 0.4 wt. percent of the feed whilst the carbon produced during the whole run accounted for a further 5.7 wt. percent of the feed. The distribution of the phenols was very similar to that observed in the earlier examples and no homologues above the trimethyl series could be detected. Anisole and its homologues were absent from the neutral portion of the product which consisted essentially of toluene and xylenes with very small quantities of benzene and trimethylbenzenes, that is of materials which could readily be removed from the phenolic product by steam stripping.

TABLE 12

| Analysis | Feed | Product |
|---|---|---|
| Phenols: | | |
| Phenol | 39.4 | 29.2 |
| o-Cresol | 30.4 | 16.7 |
| m-Cresol | 0.4 | 18.5 |
| p-Cresol | 0.6 | 6.5 |
| 2,6-xylenol | 12.8 | 2.6 |
| Other xylenols | 2.5 | 16.6 |
| Trimethylphenols | 2.7 | 1.1 |
| Tetramethylphenols | 0.9 | |
| Pentamethylphenol | 0.4 | |
| Total | 90.1 | 91.2 |
| Neutrals: | | |
| Anisole | 7.2 | |
| o-Methylanisole | 1.0 | |
| m/p-Methylanisoles | 0.2 | |
| 2,6-dimethylanisole | 0.3 | |
| Benzene, toluene, xylenes | 0.8 | 1.1 |
| Trimethylbenzenes | 0.4 | 0.4 |
| Pentamethylbenzene | 0.2 | Trace |
| Total | 10.1 | 1.6 |
| Water | | 1.8 |
| Gas | | 0.4 |
| Carbon | | 5.7 |

We claim:

1. A process for the preparation of cresols which comprises forming a first mixture consisting essentially of methanol and phenol in a molar ratio between 0.2:1 and 3.0:1, contacting said first mixture in the gaseous phase at a first temperature between 250° C. and 450° C. with an alumina catalyst consisting essentially of $\alpha$-alumina to form a first reaction product containing phenol methylates, adding phenol to at least part of said first reaction product to form a second mixture, contacting said second mixture in the gaseous phase at a second temperature higher than said first temperature, said second temperature being between 350° C. and 500° C., with an alumina catalyst consisting essentially of $\alpha$-alumina to form a second reaction product containing phenol methylates, and separating cresols from said second reaction product.

2. The process of claim 1 wherein said second mixture is formed by separating from said first reaction product a fraction boiling above the boiling-range of cresol, and adding phenol to said fraction.

3. The process of claim 1 wherein the amount of phenol present in said second mixture is such that the average molecular weight of said second mixture is approximately 108.

4. The process of claim 1 wherein said first mixture is heated at a temperature between 280° and 340° C.

5. The process of claim 1 wherein said second mixture is heated at a temperature between 400° C. and 470° C.

6. The process of claim 5 wherein said alumina catalyst is a partially dehydrated boehmite.

7. A process according to claim 1, in which the said alumina catalyst is in granular form and said process is effected in a static bed unit.

8. A process according to claim 1, in which the said alumina catalyst is in the form of microspheres and said process is effected in a fluidised bed.

References Cited
UNITED STATES PATENTS

| | | | |
|---|---|---|---|
| 2,516,152 | 7/1950 | Schulze et al. | 260—621 EX |
| 3,290,389 | 12/1966 | Hahn | 260—624 CX |
| 3,367,981 | 2/1968 | Napolitano | 260—624 C |
| 2,678,337 | 5/1954 | Good et al. | 260—621 E |

LEON ZITVER, Primary Examiner

N. MORGENSTERN, Assistant Examiner

U.S. Cl. X.R.

260—612 D